United States Patent
Giddings et al.

(10) Patent No.: US 6,208,905 B1
(45) Date of Patent: Mar. 27, 2001

(54) SYSTEM AND METHOD FOR CONTROLLING CONDITIONS IN A SPACE

(75) Inventors: Richard V. Giddings, Lester Prairie; Lloyd A. Rachor, Roseville; Larry L. Stickler, Plymouth; H. Otto von der Hoff, II, Minneapolis, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 07/811,509

(22) Filed: Dec. 20, 1991

(51) Int. Cl.$^7$ .................................................. G06F 19/00
(52) U.S. Cl. .................... 700/11; 700/9; 700/12; 700/19; 700/295; 700/300; 340/501; 340/825.07
(58) Field of Search .................. 165/201, 209, 165/212; 236/46 R, 46 C; 340/506, 500, 501, 517, 825.07; 700/4, 19, 9, 295, 10, 380, 11, 299, 14, 15, 16, 83; 702/99, 130, 138

(56) References Cited

U.S. PATENT DOCUMENTS

| | | | |
|---|---|---|---|
| 4,308,911 | * | 1/1982 | Mandl ................................. 340/501 |
| 4,536,747 | * | 8/1985 | Jensen ................................. 340/506 |
| 4,706,882 | * | 11/1987 | Barnard .............................. 165/12 |
| 4,755,792 | * | 7/1988 | Pezzolo et al. .................... 340/506 |
| 4,831,361 | * | 5/1989 | Kimura .............................. 340/506 |
| 4,916,642 | * | 4/1990 | Kaiser et al. ...................... 364/493 |
| 5,086,385 | * | 2/1992 | Launey et al. .................... 364/189 |
| 5,103,391 | * | 4/1992 | Barrett ............................... 165/12 |

FOREIGN PATENT DOCUMENTS

55920/90    1/1991   (AU).
90/08418    7/1990   (WO).

OTHER PUBLICATIONS

B. Booch, *Object–Oriented Design*, The Benjamin/Cummings Publishing Company, Inc., pp. 64,65,102,103,114 and 517 (1991).
K. Iida, et al., "Housekeeping Application with Bus Line and Telecommunication", *IEEE Transactions on Consumer Electronics*, vol. CE–32, No. 3, pp. 558–565 (Aug. 1986).
J. Rumbaugh, et al., *Object–Oriented Modeling and Design*, Prentince Hall, pp. 25 and 461 (1991).

* cited by examiner

Primary Examiner—Paul P. Gordon
(74) Attorney, Agent, or Firm—Charles L. Rubow

(57) ABSTRACT

An environmental control system for a building intended for human occupancy in which the operating environment is controlled in response to any of a plurality of states of the building as represented by a state vector. A plurality of independently operating controllers contain stored sets of addressable control functions which are accessed by the state vector signal. The controllers produce operating point signals for apparatuses which affect operating environment parameters in accordance with the addressed control functions.

32 Claims, 4 Drawing Sheets

SYSTEM AND METHOD FOR CONTROLLING CONDITIONS IN A SPACE

BACKGROUND OF THE INVENTION

The present invention relates generally to control of apparatuses affecting parameters which characterize the operating environment in a control space, and more particularly to a polymorphic distributed control system for determining the operating environment as a function of any of a plurality of control space states.

Coordinated management of equipment for environmental control, lighting, security, entertainment, load/energy control, and scheduling of the foregoing, as well as scheduling the operation of appliances and devices used in homes, buildings and similar spaces has long been recognized as a desirable objective for saving energy, improving security and achieving other benefits. There has been substantial progress in the development of apparatus and systems for achieving these objectives in commercial buildings.

There are also a number of systems and approaches for achieving these objectives, generally known as home automation, for residential usage. However, such systems and approaches are found predominantly in very expensive homes. There has been little success or progress in creating a demand or market for such systems among average homeowners for use in typical homes. One of the reasons for this is that presently available systems are quite complex and expensive, requiring that the owner either have sufficient wealth and interest in such a system to engage a specialist to design, install and maintain it, or to have sufficient technical knowledge and interest to do so himself.

Systems as described above have normally been of a custom design for each owner. More recently there have been various attempts to design home automation systems with more universal applicability. However, these systems are generally based on design criteria that essentially require the installation of infrastructure (i.e., special wiring, sensors, controllers and actuators) at initial construction. This adds substantial cost to the basic house, which many consumers are unwilling to pay at that time. These approaches have the further disadvantage that a single installer is required to be familiar with all aspects of the system, including, for example, HVAC equipment, lighting controls, security equipment, voice and data communications equipment, entertainment systems, etc. Traditionally, these equipments and systems have been handled through separate channels by separate installers with little crossover between them. Finally, for reasons apparent from the foregoing discussion, these approaches and systems are not suitable for the retrofit market.

With the foregoing in mind, the applicants have devised a somewhat different approach to home automation, based on polymorphic system concepts analogous to those used for manipulating data in object oriented data processing systems. The approach involves partitioning of environmental control functions and appliances in a home into somewhat logical groups, each group under common control and capable of functioning in a stand-alone conventional manner, but with the ability to communicate with a state vector controller which provides coordinated control for user convenience and scheduling. Communications between individual operating environment controllers and the state vector controller occur over a relatively simple communications bus. Thus, the applicants have minimized or overcome many of the impediments to wide acceptance inherent in prior art approaches to home/building automation.

Although the applicants' invention is described in the context of a home automation system, it is pointed out that the invention is considerably broader in scope. In its broadest sense the invention is a polymorphic distributed control system useful in a wide range of applications, including but not limited to, manufacturing and industrial processes, and other control systems, in addition to control of the environment in homes and buildings. For that reason, it is intended that, as used herein, terms such as control space, state vector, operating environment, control function, etc., be taken to have broad meanings, not limited to a particular physical embodiment.

SUMMARY OF THE INVENTION

The applicants' invention is a system and a method for controlling the operating environment in a control space as a function of any of a plurality of control space states, each state being represented by a state vector having components indicative of a plurality of substrates. A plurality of independent operating environment controllers, each affecting separate parameters which characterize the operating environment have stored therein sets of addressable control functions accessible by a state vector signal, whereby a common state vector signal causes the operating environment controllers to function in different manners to achieve an integrated operating environment in the control space.

The sets of addressable control functions may each comprise an n dimensional matrix of control functions, each dimension of the matrix corresponding to a component of the state vector signal. The operating environment controllers may be controllers capable of conventional autonomous operation in the absence of a recognizable state vector signal. Communication between a state vector controller and the plurality of operating environment controllers may be provided over a simple communication bus to which additional operating environment controllers may be connected without knowledge of or interaction with other operating environment controllers in the system.

BRIEF DESCRIPTION OF THE DRAWINGS

FIG. 4 is an example of a matrix of addressable control functions which may be stored in the environmental control apparatus shown in the block diagram of FIG. 2; and FIG. 5 is an example of a matrix of addressable control functions which may be stored in lighting control apparatus shown in the block diagram of FIG. 2.

DESCRIPTION OF THE PREFERRED EMBODIMENT

Figure 1:
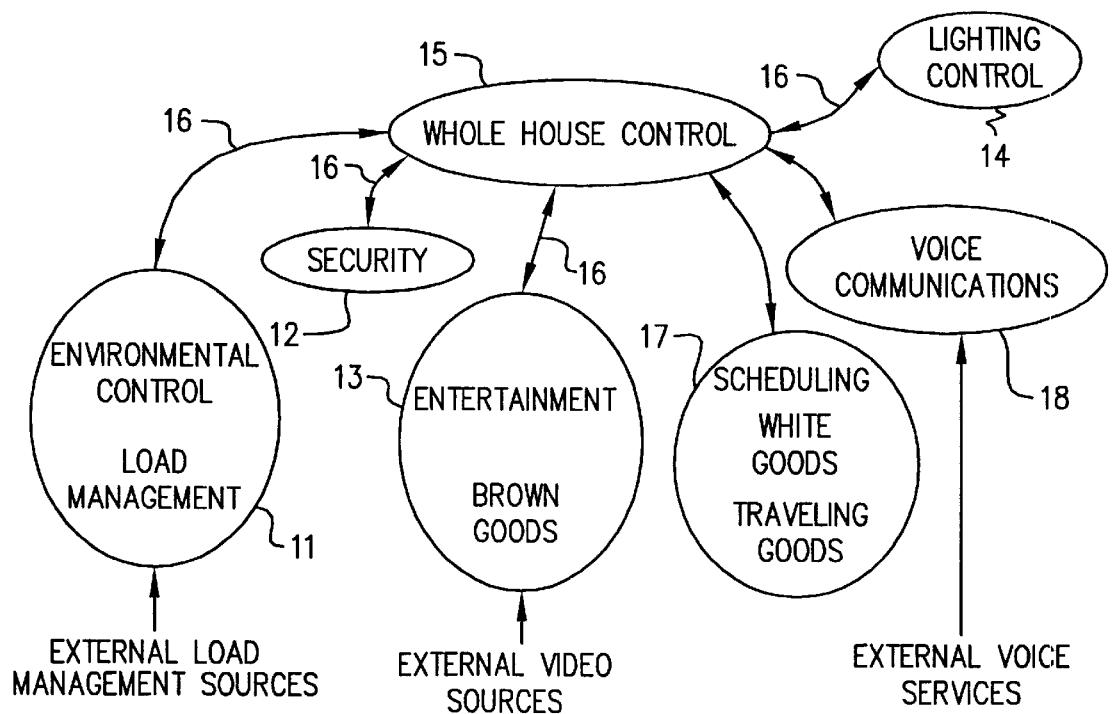
FIG. 1 is a diagram illustrating the concept of the applicants' invention in the context of a home automation system.

In the concept diagram of FIG. 1, ovals identified by reference numerals 11–14 represent control of various parameters which may characterize the operating environment of a house. Although a house is used for illustrative purposes, the applicants' concept is generally applicable to a variety of other buildings, as well as to distributed control systems in general.

Oval 15 represents a control function which performs a coordination role for controls 11–14. Bidirectional arrows 16 between each of controls 11–14 and control function 15 indicate that there is communication therebetween. The absence of such arrows between individual controls 11–14 indicates that communication directly between the controls is not allowed. As will become apparent from the following discussions, a principal purpose for this arrangement is to preclude the possibility of control conflicts. In the example of FIG. 1, the parameters affected by controls 11–14 include HVAC environment, security, entertainment and lighting respectively.

Scheduling control, as represented by oval 17 has a role in all of controls 11–14, and is thus provided through coordination control 15. Similarly, voice communications, as represented by oval 18 may have a role in all of controls 11–14, and is provided through coordination control 15.

Figure 2:
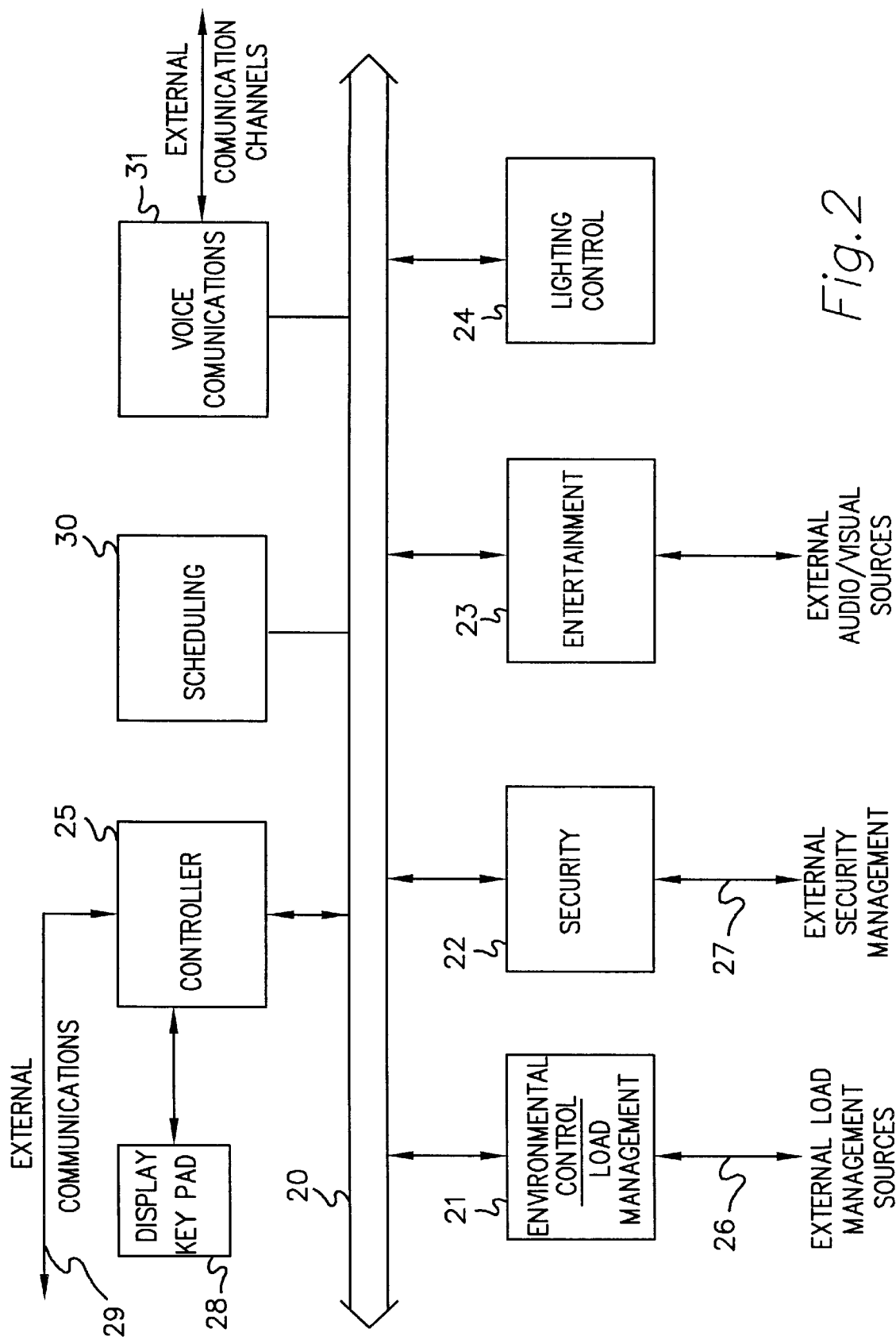
FIG. 2 is a block diagram of a system for implementing the concept of FIG. 1.

A representative implementation of the system concept of FIG. 1 is shown in block diagram form in FIG. 2, in which reference numeral 20 identifies a communication bus for providing communication between a plurality of operating environment controllers 21–24 and a state vector controller 25 which manages the operating environment controllers, as well as performing certain other functions. Any of a variety of known communication busses may be suitable for providing the required communication. The data transmission requirements are very modest, permitting the use of a relatively simple bus. A bus design particularly suitable for this function is described in detail in U.S. Pat. No. 5,625,644 issued Apr. 29, 1997 in the name of David Myers, entitled "A DC Balanced 4B/8B Binary Block Code For Digital Data Communications" and assigned to the assignee of the present application.

The operating environment controllers specifically shown in the block diagram of FIG. 2 include an HVAC environmental controller 21, a security system controller 22, an entertainment system controller 23 and a lighting controller 24. Each of controllers 21–24 is capable of conventional autonomous operation, but has the added capability of operating under centralized direction from state vector controller 25 to function in concert with the other operating environment controllers to achieve a desired total operating environment. As further described hereinafter, in the absence of a recognizable signal on bus 20, each of the operating environment controllers operates as a conventional stand alone controller.

A thermostat capable of performing various HVAC environmental control functions and capable of communicating over the bus described in the previously identified patent is shown and described in U.S. Pat. No. 5,197,668 issued Mar. 30, 1993 the names of James Ratz, Robert Schnell and Daniel Uhrich, entitled "Communicating Thermostat", and U.S. Pat. No. 5,263,497 issued Apr. 20, 1993 in the names of James Ratz and Robert Schnell, entitled "communicating Thermostat", both patents assigned to the assignee of the present application. It is, however, pointed out that although the thermostats covered by the above identified patent applications entitled "Communicating Thermostat" are capable of communicating on a bus as described, they are not otherwise implemented as required for the present system and method.

An arrow 26 associated with HVAC environmental controller 21 indicates that the controller may be of a type capable of load management in response to an external signal, such as may be transmitted by a utility which supplies electricity, gas or other form of energy. A load management signal as indicated at 26 may be used both in controller 21 for load shedding or other energy usage management purposes, and may be supplied over bus 20 to state vector controller 25, which may, for example, provide an energy management command to lighting controller 24.

Conversely, depending on the particular system configuration, a load management signal may be supplied first to state vector controller 25 which, in turn, issues appropriate commands to controllers 21 and 24.

Similarly, security controller 22 is shown with an arrow 27 indicating communication capability with an external security manager. This communication capability may be used when controller 22 is operating as a stand-alone controller, or may function as a gate-way for communications between the entire system of FIG. 2 and an external security manager.

State vector controller 25 may include a display and/or key pad for displaying status information, sensed parameter values, controller operating parameters, etc., and for receiving commands or instructions of various types. As identified by reference numeral 28, the display and/or key pad may also be external to controller 25 which may also be capable of receiving information and/or commands and supplying information over an external communication link 29.

Reference numeral 30 identifies a scheduling controller for scheduling system operation as well as scheduling operation of individual operating environment controllers. Although scheduling controller 30 is shown as a separate unit, it may be physically integrated into state vector controller 25.

Reference numeral 31 identifies a voice communications controller through which voice communications for a variety of purposes may be supplied or received. An exemplary function of voice communications may be to provide voice prompts for remote programming or changing of programs elsewhere in the system.

Figure 3:
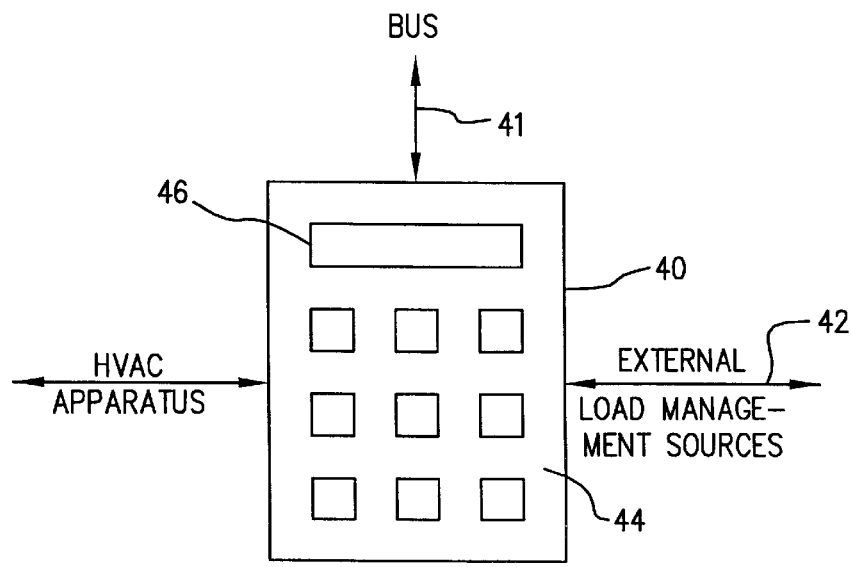
FIG. 3 is a more detailed illustration of environmental control apparatus suitable for use in the system of FIG. 2.

FIG. 3 illustrates an HVAC environmental controller 40 having a connection 41 to a communications bus and a connection 42 to an external load management source. Controller 40 furnishes operating point signals to HVAC apparatus for affecting the HVAC environment in a controlled space by way of either stand-alone operation or integrated operation with other controllers. Controller 40 is shown having a key pad 44 for inputting set points, scheduling and programming in a manner similar to that provided in conventional programmable thermostats. Controller 40 is also shown as having a display 46 for displaying sensed parameters, apparatus operating parameters and programming information.

Very user friendly operation of the applicants' system is achieved through the embodiment therein of polymorphic control system concepts. In the context of achieving any of a plurality of desired operating environments in a home, the user need only input a single command or simple set of commands, such as by actuating a button labeled "occupied", or by actuating buttons labeled "occupied" and "no negative impact", or "away" and "avoid waste". These inputs are converted into a state vector signal by controller 25 and communicated over bus 20 to the various operating environment controllers connected to the bus. As will be described hereinafter, each operating environment controller responds to the state vector signal in its own way, but in concert with the other operating environment controllers to achieve the desired total operating environment.

Such operation is achieved by storing in each operating environment controller a set of addressable control functions which are accessed by the state vector signal. The set of addressable control functions may comprise an n dimensional matrix of such functions wherein each dimension corresponds to a separate component of the state vector signal. Thus, in each operating environment controller the state vector signal identifies a control function located at the designated address in the matrix of control functions. A common state vector signal can thereby bring into action a number of unrelated control functions, depending only on the arrangements of the matrices of control functions in the operating environment controllers.

The system can easily be expanded or the operating environment determined thereby changed by adding controllers for additional operating environment parameters or replacing an operating environment parameter with one having expanded capabilities. For example, an HVAC operating environment controller or thermostat having rather basic capabilities for controlling temperature might be replaced with one having capabilities for controlling temperature and humidity independently in different zones. Both controllers would respond to the same state vector signal, but each would respond according to its own capabilities to achieve a commanded operating environment corresponding to, for example, occupants "away", "avoid waste".

Figure 4:
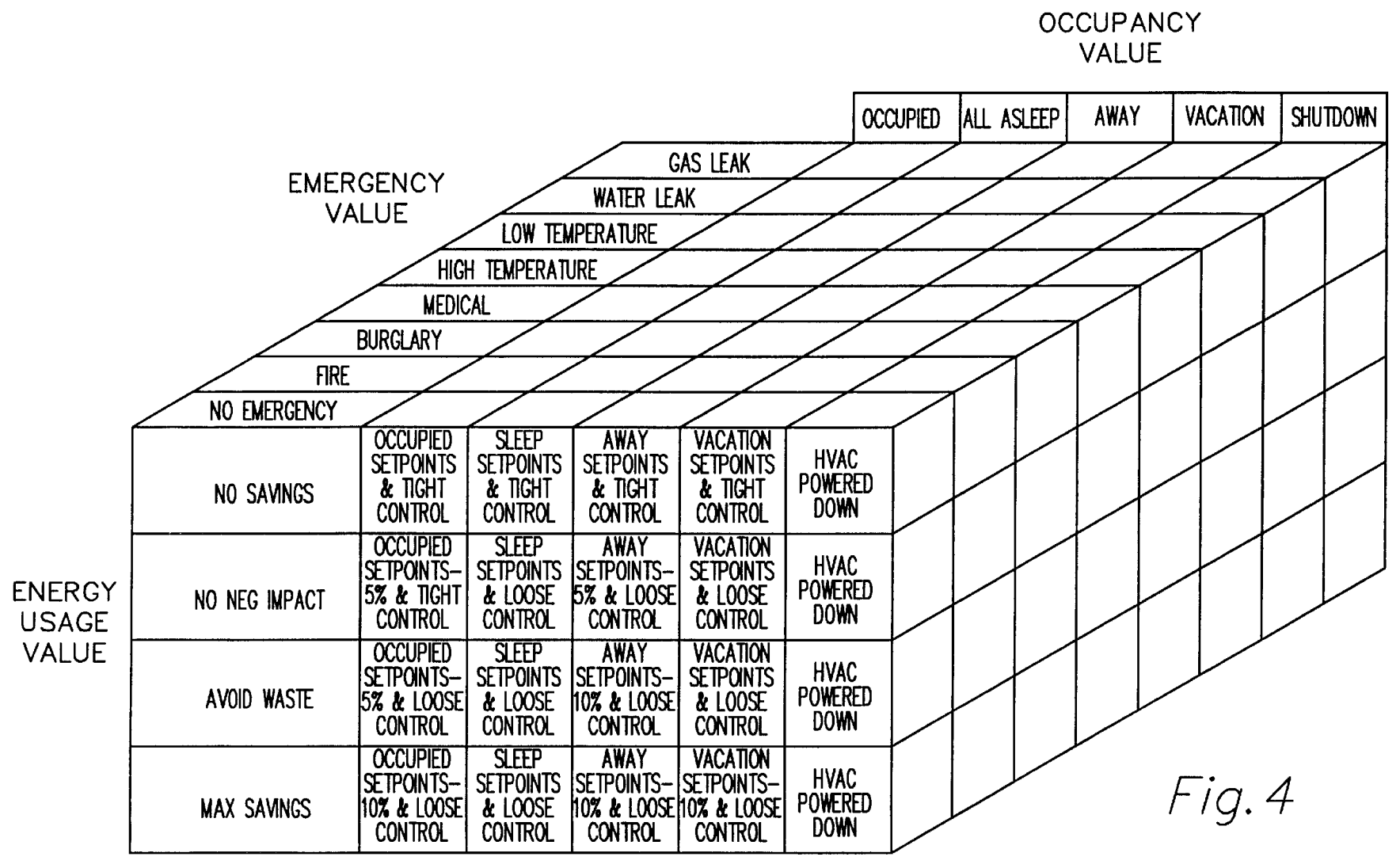

FIG. 4 illustrates a matrix of control functions which might be stored within an HVAC operating environment controller such as controller 21 in FIG. 2. The matrix is illustrated as a three dimensional matrix with space occupancy values, space energy usage values and space emergency values corresponding to components of the state vector signal along the three dimensions of the matrix. Representative control functions for the front tier of addresses in the matrix, as seen in FIG. 4, are shown. Similar control functions might be arranged in the tiers behind the front tier of the matrix. It should also be noted that some addresses might be vacant, corresponding to forbidden state vectors or control functions.

In the event the state vector controller fails to provide a state vector signal or provides only an incomplete state vector signal or an operating environment controller fails to recognize a state vector signal, that controller reverts to a default mode in which it operates in accordance with a predetermined control function. For example, the HVAC environmental controller may revert to operation in accordance with the control function corresponding to the "occupied", "no savings", "no emergency" state vector.

Figure 5:
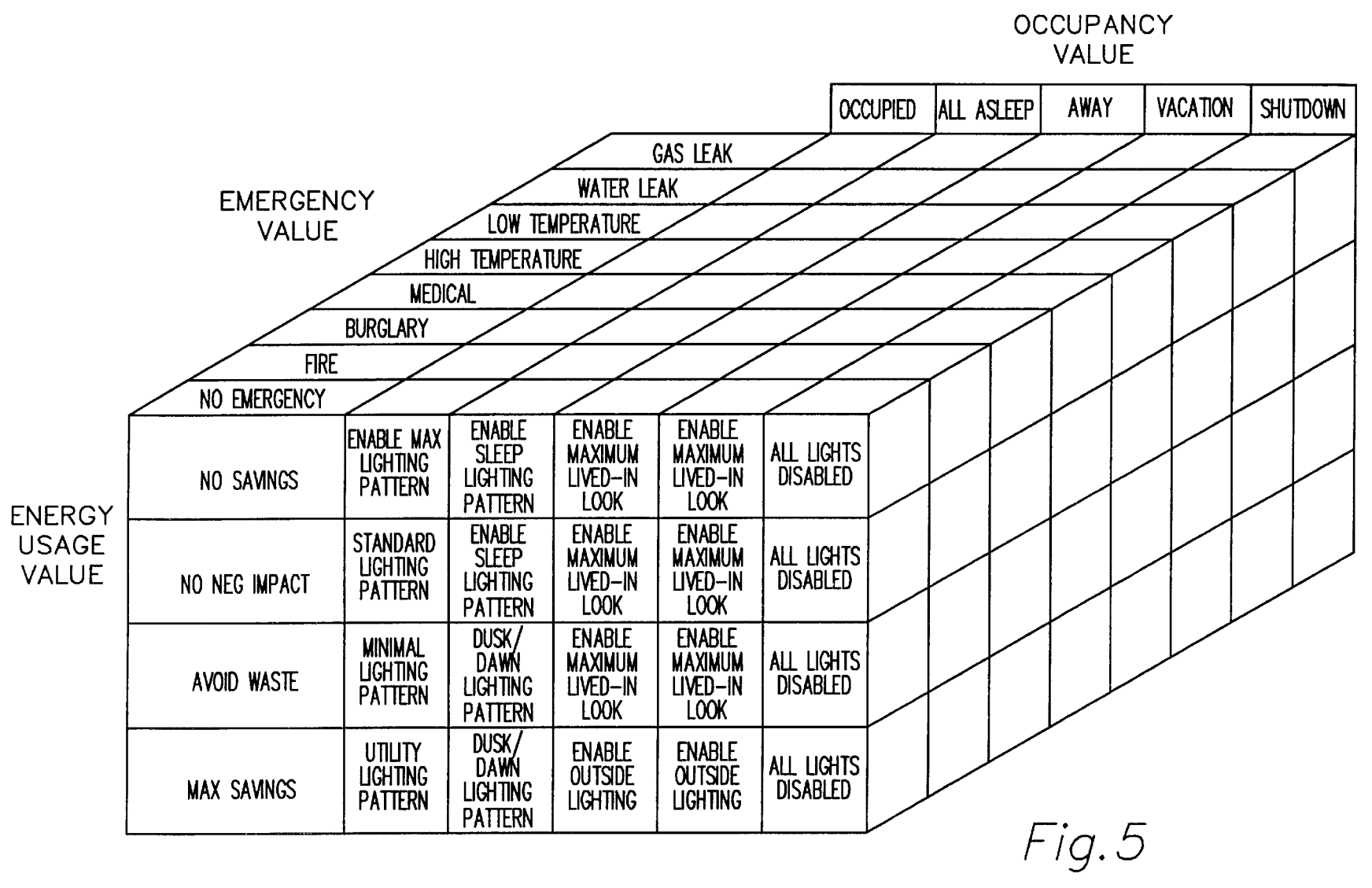

FIG. 5 illustrates a three dimensional matrix of control functions which might be stored in lighting controller 24. Note that the same state vector signal results in an entirely different control function for the two controllers. However, the two controllers operate in concert to achieve an integrated total operating environment in the control space.

Although a particular implementation of the applicants' invention has been shown and described for illustrative purposes, a variety of other embodiments which do not depart from the applicants' contemplation and teaching will be apparent to those of ordinary skill in the relevant arts. It is intended that coverage not be limited to the embodiment shown, but only by the terms of the following claims.

The embodiments of the invention in which an exclusive property or right is claimed are defined as follows.

What is claimed is:

1. A system for determining the operating environment in a control space as a function of any of a plurality of control space states by means of individually controllable apparatuses responsive to operating point signals derived from the control space states, the system comprising:

a state vector controller for supplying a state vector signal indicative of any of a plurality of states of the control space, the state vector signal specifying an address for a control function in a set of addressable control functions;

a plurality of operating environment controllers for furnishing operating point signals to apparatuses affecting separate parameters which characterize the operating environment of the control space, at least each of first and second operating environment controllers of said plurality of operating environment controllers having stored therein a set of addressable control functions accessible by a state vector signal, and operable in response thereto to furnish first operating point signals to apparatuses respectively associated with said first and second operating environment controllers, the sets of addressable control functions in said first and second operational environment controllers being arranged so that a common state vector signal causes both of said first and second operating environment controllers to furnish operating point signals having values which cause the apparatuses respectively associated therewith to act in concert; and communication means connecting said state vector controller and said plurality of operating environment controllers for conveying the state vector signal to at least said first and second operating environment controllers.

2. The system of claim 1 wherein:

the sets of addressable control functions stored in said first and second operating environment controllers each comprise an n dimensional matrix of control functions; and the state vector signal forms control function addresses which have components corresponding to each of the dimensions of the n dimensional matrix.

3. The system of claim 2 wherein:

a first dimension of the matrices of addressable control functions in said first and second operating environment controllers reflects a space occupancy variable; and a second dimension of the matrices of addressable control functions in said first and second operating environment controllers reflects a space energy usage variable.

4. The system of claim 3 wherein:

said state vector controller includes input means allowing a user to specify in user friendly terms at least certain variables associated with the control space; and said state vector controller is operable to supply a state vector signal in response to the specified space variables.

5. The system of claim 4 wherein:

the control space is a home;

a first variable for which the input means of said state vector controller allows for user specification and the first dimension of the matrices of addressable control functions in said first and second operating environment controllers comprise space occupancy values selected from a group comprising "occupied", "all asleep", "away", "vacation" and "shut down"; and a second variable for which the input means of said state vector controller allows for user specification and the second dimension of the matrices of addressable control functions in said first and second operating environment controllers comprise space energy usage values selected from a group comprising "no savings", "no negative impact", "avoid waste" and "maximum savings".

6. The system of claim 5 wherein the matrices of addressable control functions in said first and second operating environment controllers have a third dimension reflecting a space emergency variable having values selected from a group comprising "no emergency", "fire", "burglary", "medical", "high temperature", "low temperature", "water leak" and "gas leak".

7. The system of claim 6 wherein said first and second operating environment controllers are for HVAC and lighting controls respectively.

8. The system of claim 7 wherein at least one of said plurality of operating environment controllers is operable to furnish first operating point signals having values derived from control functions corresponding to address components identified by predetermined state vector components for any unidentified components in the state vector signal.

9. The system of claim 8 wherein at least one of said plurality of operating environment controllers is operable to furnish first operating point signals having values derived from control functions corresponding to a predetermined state vector in the absence of a state vector signal.

10. The system of claim 9 wherein at least one of said plurality of operating environment controllers is operable to:
produce second operating point signals respectively having values effective to cause predetermined ones of the apparatuses to achieve desired values of the operating parameters affected thereby; and
selectively substitute the second operating point signals for the first operating point signals furnished to said predetermined ones of the apparatuses.

11. A method of determining the operating environment in a control space as a function of any of a plurality of states of the control space by means of individually controllable apparatuses responsive to operating point signals derived from the control space states, the method comprising the steps of:
providing a set of addressable control functions for each of a plurality of apparatuses respectively operable to affect a plurality of separate parameters which characterize the operating environment of a control space, said set of addressable control functions for each apparatus residing in an operating environment controller unique to that apparatus;
supplying a command set signal representing a polymorphic command set indicative of any of a plurality of predetermined states of the control space, the command set signal corresponding to the address of addressable control function effective to cause the apparatuses to achieve the commanded operating environment in the space; and
furnishing first operating point signals having values established by the addressable control functions corresponding to the command set signal to the apparatuses respectively associated with the sets of addressable control functions.

12. The method of claim 11 wherein:
said step of providing a set of addressable control functions comprises providing an n dimensional matrix of addressable control functions; and
said command set signal corresponds to addresses which have components in each of the dimensions of the n dimensional matrix.

13. The method of claim 12 wherein:
first and second matrices of addressable control functions reside in first and second operating environment controllers for first and second apparatuses which affect first and second operating parameters respectively of the control space; and
said first and second matrices each have a first dimension reflecting a space occupancy variable, the first dimension being associated with a first component of the address corresponding to the command set signal.

14. The method of claim 13 wherein said first and second matrices of addressable control functions each have a second dimension reflecting a space energy usage variable, the second dimension being associated with a second component of the address corresponding to the command set signal.

15. The method of claim 14 wherein:
the first dimension of said first and second matrices comprises space occupancy values selected from a group comprising "occupied", "all asleep", "away", "vacation" and "shut down"; and
the second dimension of said first and second matrices comprises space energy usage values selected from a group comprising "no savings", "no negative impact", "avoid waste" and "maximum savings".

16. The method of claim 15 wherein said first and second matrices of addressable control functions each have a third dimension reflecting a space emergency variable having values selected from the group comprising "no emergency", "fire", "burglary", "medical", "high temperature", "low temperature", "water leak" and "gas leak".

17. The method of claim 16 wherein the first and second operating environment controllers are for furnishing operating point signals to HVAC and lighting control apparatuses respectively.

18. The method of claim 17 including the step of furnishing first operating point signals having values corresponding to addresses identified by predetermined address components for any undefined components in the command set signal.

19. The method of claim 18 including the step of furnishing first operating point signals having values corresponding to predetermined addresses in said matrices of control functions in the absence of a command set signal.

20. The method of claim 19 including the further steps of:
producing an address signal corresponding to said command set signal, the address signal specifying an address in which the number of address components is equal to the maximum number of dimensions in any said n dimensional matrix; and
furnishing first operating point signals having values corresponding to the address defined by the address signal.

21. The method of claim 20 including the further steps of:
producing second operating point signals respectively having values effective to cause predetermined ones of the apparatuses to achieve desired values of the parameters affected thereby; and
selectively substituting the second operating point signals for the first operating point signals furnished to said predetermined ones of the apparatuses.

22. The method of claim 21 including the step of furnishing first operating point signal having values corresponding to addresses identified by predetermined address components for any address components unidentified in the command set signal.

23. The method of claim 22 including the step of furnishing first operating point signals having values corresponding to predetermined addresses in the matrices of addressable control functions in the absence of a command set signal.

24. The method of claim 12 including the further steps of:

producing an address signal corresponding to said command set signal, the address signal specifying an address in which the number of address components is equal to the maximum number of dimensions in any said n dimensional matrix; and furnishing first operating point signals having values corresponding to the address specified by the address signal.

25. The method of claim 24 including the further steps of:

producing second operating point signals respectively having values effective to cause predetermined ones of the apparatuses to achieve desired values of the parameters affected thereby; and selectively substituting the second operating point signals for the first operating point signals furnished to said predetermined ones of the apparatuses.

26. The method of claim 25 including an operating environment controller for furnishing operating point signals to HVAC apparatus.

27. In a system for determining operating parameters in a control space by means of individually controllable apparatuses, each apparatus affecting a separate operating parameter in accordance with an operating point signal, a method for integrated control of the apparatuses to achieve any of a plurality of predetermined operating states of the control space in response to a user friendly command set, comprising the steps of:

providing a plurality of operating environment controllers, each for supplying an operating point signal to a separate apparatus affecting an operating parameter in the control space, each of said operating environment controllers being responsive to an address signal to supply a first operating point signal having a value derived from a set of addressable control functions stored in the operating environment controller, the sets of addressable control functions stored in said plurality of operating environment controllers being arranged so that a common address signal will address the control functions in all of the operating environment controllers effective to cause the apparatuses to function in an integrated manner to achieve the commanded operating environment in the control space; and supplying an address signal to the plurality of operating environment controllers, the address signal corresponding to a command set signal representing a polymorphic command set indicative of any of a plurality of states of a control space.

28. The method of claim 27 in which at least a first operating environment controller of said plurality of operating environment controllers includes:

input means allowing a user to specify a desired value for the parameter affected by the apparatus controlled by said first operating environment controller, said first operating environment controller being operable to supply a second operating point signal in place of the first operating point signal.

29. The method of claim 28 wherein:

the set of addressable control functions stored in at least said first operating environment controller is an n dimensional matrix of addressable control functions; and said address signal specifies an address having components corresponding to each of the dimensions of the n dimensional matrix.

30. The method of claim 29 wherein:

a first dimension of said n dimensional matrix of addressable control functions reflects a space occupancy variable; and a second dimension of said n dimensional matrix of addressable control functions reflects a space energy usage variable.

31. The method of claim 30 wherein a third dimension of said n dimensional matrix of addressable control functions reflects a space emergency variable.

32. The method of claim 31 wherein said first operating environment controller is operable to supply operating point signals to HVAC control apparatus.

* * * * *